United States Patent
Gaiser et al.

(10) Patent No.: US 7,404,290 B2
(45) Date of Patent: Jul. 29, 2008

(54) EXHAUST SYSTEM FOR AN INTERNAL COMBUSTION ENGINE

(75) Inventors: Gerd Gaiser, Reutlingen (DE); Robert Hanitzsch, Waiblingen (DE); Josef Rudelt, Aichwald (DE)

(73) Assignee: J. Eberspaecher GmbH & Co., Esslingen (DE)

( * ) Notice: Subject to any disclaimer, the term of this patent is extended or adjusted under 35 U.S.C. 154(b) by 365 days.

(21) Appl. No.: 11/240,282

(22) Filed: Sep. 30, 2005

(65) Prior Publication Data

US 2006/0070374 A1    Apr. 6, 2006

(30) Foreign Application Priority Data

Oct. 1, 2004    (DE) .................. 10 2004 048 336

(51) Int. Cl.
*F01N 3/00* (2006.01)

(52) U.S. Cl. .................. 60/289; 60/286; 60/288; 60/295

(58) Field of Classification Search .............. 60/286, 60/295, 288, 289
See application file for complete search history.

(56) References Cited

U.S. PATENT DOCUMENTS

| | | | | |
|---|---|---|---|---|
| 4,576,617 A | * | 3/1986 | Renevot | 95/279 |
| 4,955,183 A | * | 9/1990 | Kolodzie et al. | 60/303 |
| 5,038,562 A | * | 8/1991 | Goerlich | 60/274 |
| 5,522,218 A | * | 6/1996 | Lane et al. | 60/274 |
| 5,605,042 A | * | 2/1997 | Stutzenberger | 60/286 |
| 5,606,856 A | * | 3/1997 | Linder et al. | 60/286 |
| 5,771,689 A | * | 6/1998 | Bareis et al. | 60/286 |
| 5,826,428 A | * | 10/1998 | Blaschke | 60/303 |
| 6,050,088 A | * | 4/2000 | Brenner | 60/303 |
| 6,192,677 B1 | * | 2/2001 | Tost | 60/286 |
| 6,279,603 B1 | * | 8/2001 | Czarnik et al. | 137/339 |
| 6,449,947 B1 | * | 9/2002 | Liu et al. | 60/286 |
| 6,470,673 B1 | * | 10/2002 | van Nieuwstadt et al. | 60/274 |
| 6,513,323 B1 | * | 2/2003 | Weigl et al. | 60/286 |
| 6,539,708 B1 | * | 4/2003 | Hofmann et al. | 60/286 |
| 6,718,757 B2 | * | 4/2004 | Khair et al. | 60/286 |
| 6,722,123 B2 | * | 4/2004 | Liu et al. | 60/286 |
| 6,863,522 B2 | | 3/2005 | Boneberg et al. | |
| 7,000,383 B2 | * | 2/2006 | van Nieuwstadt et al. | 60/286 |

(Continued)

FOREIGN PATENT DOCUMENTS

DE        3532778 A1    3/1987

(Continued)

*Primary Examiner*—Thomas Denion
*Assistant Examiner*—Loren Edwards
(74) *Attorney, Agent, or Firm*—Howard IP Law Group PC

(57) ABSTRACT

The present invention relates to an exhaust system for an internal combustion engine, having an exhaust line for removing exhaust gas from the internal combustion engine and having a secondary fuel supply for introducing secondary fuel into the exhaust gas of the internal combustion engine. To improve the introduction of the secondary fuel into the exhaust, a recirculation device is connected to the exhaust line and to the secondary fuel supply so that the introduction of secondary fuel into the exhaust is accomplished via or through the recirculation device. The recirculation device has a circulation space which receives an exhaust substream from the exhaust line in which the secondary fuel is introduced into the exhaust substream and from which the modified exhaust substream is returned to the exhaust line.

12 Claims, 3 Drawing Sheets

U.S. PATENT DOCUMENTS

| | | |
|---|---|---|
| 7,062,903 B2 * | 6/2006 | Brenner et al. .................. 60/286 |
| 7,168,241 B2 * | 1/2007 | Rudelt et al. .................. 60/286 |
| 2002/0064739 A1 | 5/2002 | Boneberg et al. |
| 2004/0081592 A1 | 4/2004 | Brenner et al. |

FOREIGN PATENT DOCUMENTS

| | | |
|---|---|---|
| DE | 4025017 A1 | 2/1992 |
| DE | 19625447 A1 | 2/1998 |
| EP | 1054139 A1 | 11/2000 |
| EP | 1149991 A2 | 10/2001 |
| EP | 1209331 A2 | 5/2002 |

* cited by examiner

EXHAUST SYSTEM FOR AN INTERNAL COMBUSTION ENGINE

FIELD OF INVENTION

The present invention relates to an exhaust system for an internal combustion engine, in particular in a motor vehicle.

BACKGROUND OF THE INVENTION

A modern exhaust system includes an exhaust line which removes the exhaust from the internal combustion engine and is used to after-treat the exhaust gases, in particular to clean them. For example, an exhaust system in an exhaust line may include a particle filter which filters out the particles, preferably soot particles, that are entrained in the exhaust gas of the internal combustion engine, in particular a diesel engine, and incorporates them. Such a particle filter must be regenerated at certain intervals in time to prevent an excessive increase in backpressure in the flow through the particle filter. Such regeneration can be initiated by a short-term increase in temperature in the exhaust gas. The exhaust gas temperatures occurring in normal operation of an internal combustion engine are not sufficient for this, however. Accordingly, additional measures must be taken to raise the exhaust temperature accordingly. One possibility for raising the temperature in the exhaust is to introduce secondary fuel into the exhaust. This secondary fuel can then react with the residual oxygen contained in the lean exhaust, resulting in the desired increase in temperature. To support the oxidation of the secondary fuel, an oxidation catalyst may be arranged in the exhaust line upstream from the particle filter. It is likewise possible to design the particle filter itself to be catalytically active.

The situation is also similar for an $NO_x$ storage catalyst which may be arranged in the exhaust line in addition to or as an alternative to the particle filter to remove nitrogen oxides from the exhaust gases. An $NO_x$ storage catalyst must also be regenerated occasionally, to which end a reducing atmosphere is needed in the exhaust gas.

One problem with the introduction of secondary fuel into the exhaust is the fact that the secondary fuel must be present in vapor form to achieve the most complete possible oxidation. However, adequate vaporization of the secondary fuel injected into the exhaust line cannot be guaranteed at low exhaust temperatures.

The present invention is concerned with the problem of providing an improved embodiment or at least a different embodiment for an exhaust system of the type defined above such that the evaporation of the secondary fuel supplied to the exhaust in particular is improved even at low exhaust temperatures.

SUMMARY OF THE INVENTION

This invention is based on the general idea of not supplying the secondary fuel to the exhaust stream conveyed in the exhaust line directly but instead introducing it into an exhaust substream branched off from the exhaust stream and then returning the exhaust substream thus modified to the overall exhaust stream. The secondary fuel is introduced into the exhaust substream in a circulation space of the recirculation device which is connected in a suitable way to the exhaust line. Since the introduction of secondary fuel in the circulation space takes place separately from the main exhaust stream carried in the exhaust line, boundary conditions may be created in the circulation space supporting complete evaporation of the secondary fuel introduced there. For example, the flow rate, the exhaust gas mass flow and the temperature may be selected in the circulation space essentially independently of the corresponding values in the exhaust line. Thus especially suitable conditions can be created for evaporation in the circulation space, which simplifies complete evaporation of the secondary fuel introduced there.

According to an advantageous embodiment, the circulation space may be designed to be cylindrical and may intersect a longitudinal section of the exhaust line, forming a connecting opening such that a longitudinal direction of the circulation space extends at an inclination with respect to a longitudinal direction of the longitudinal section of the exhaust line. The connecting opening has an oncoming flow edge over which the exhaust gas substream penetrates from the exhaust line into the circulation space. In addition, the connecting opening has an outgoing flow edge which is situated in the exhaust line upstream from the oncoming flow edge and via which the modified exhaust substream is returned from the circulation space to the exhaust line. Such an embodiment is characterized by a simple design and can be implemented inexpensively accordingly. In particular, branching off and recycling of the exhaust substream can be implemented especially easily.

An evaporator body which receives liquid secondary fuel from the secondary fuel supply and on which the secondary fuel is evaporated and picked up by the exhaust substream may be expediently be arranged in the circulation space. The evaporation effect can be greatly improved by integrating such an evaporator body into the circulation space.

According to another embodiment, the evaporator body may be designed like a sleeve and arranged coaxially in the cylindrical circulation space, whereby the secondary fuel supply acts upon an inside of the evaporator body with secondary fuel, while the evaporator body exposes the evaporated secondary fuel on the outside to the exhaust gas substream. This achieves the result that the exhaust gas substream can entrain only vaporized secondary fuel, so that ultimately only vaporized secondary fuel is returned back into the exhaust line. The mechanism of action of the recirculation device with respect to the introduction of vaporized secondary fuel into the exhaust gas is thereby additionally increased.

Other important features and advantages of this invention are derived from the claims, the drawings and the respective description of the figures on the basis of the drawings.

It is self-evident that the features described above and those to be explained below may be used not only in the respective combination given but also in other combinations or alone without going beyond the scope of the present invention.

BRIEF DESCRIPTION OF THE DRAWINGS

Preferred exemplary embodiments of this invention are depicted in the drawings and explained in greater detail in the following description, where the same reference numbers are used to refer to the same or functionally identical or similar parts.

The figures show schematically.

DETAILED DESCRIPTION

Figure 1:
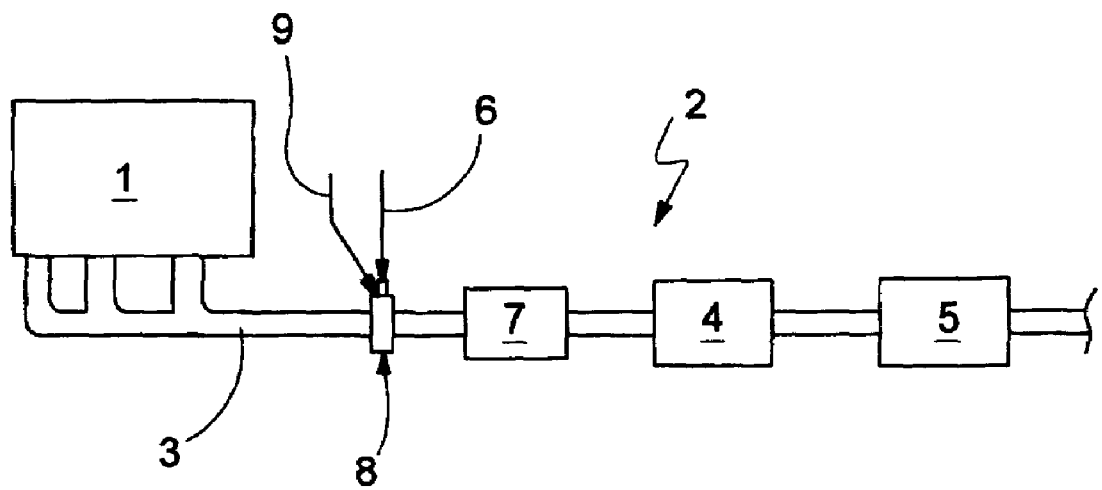
FIG. 1 illustrates a greatly simplified schematic diagram like a wiring diagram of an internal combustion engine equipped with an exhaust system according to an embodiment of the invention.

According to FIG. 1, an internal combustion engine 1, which may be designed as a gasoline engine or preferably as a diesel engine, is equipped with an exhaust system 2 which removes the exhaust from the internal combustion engine 1 and sends it for an aftertreatment. The internal combustion engine 1 is usually situated in a motor vehicle together with the exhaust system 2.

The exhaust system 2 comprises an exhaust line 3 which receives the exhaust gases generated by the internal combustion engine 1 and removes them from the internal combustion engine 1. A particle filter 4 may be provided in the exhaust line 3 after exhaust line 3 to filter out and store particles, in particular soot particles, contained in the exhaust gas of the internal combustion engine 1. In addition to or as an alternative to the particle filter 4, an $NO_x$ storage catalyst 5 may be provided in the exhaust line 3 to adsorb the nitrogen oxides contained in the exhaust gas. For regeneration of the particle filter 4 and/or the $NO_x$ storage catalyst 5, it is necessary to induce a corresponding increase in temperature in the particle filter 4 and/or in the $NO_x$ storage catalyst 5. This is achieved with the exhaust system 2 shown here with the help of secondary fuel which is introduced into the exhaust gas. To this end, the exhaust system 2 is equipped with a secondary fuel supply 6, which supplies the secondary fuel needed for introduction into the exhaust gas. The secondary fuel is expediently the same fuel as that with which the internal combustion engine 1 operates, i.e., gasoline or diesel.

The secondary fuel introduced into the exhaust gas should undergo oxidation in conjunction with an appropriate oxidizer, preferably oxygen from the air or residual oxygen from the exhaust gas. Heat released in this process can be utilized to raise the temperature of the exhaust gas and thus the temperature of the particle filter 4 and/or of the $NO_x$ storage catalyst 5. To initiate, i.e., support this oxidation of the secondary fuel, an oxidation catalyst 7 may be provided in the exhaust line 3 upstream from the particle filter 4 and/or upstream from the $NO_x$ storage catalyst 5. It is clear that such an oxidation catalyst 4 may essentially also be integrated into the particle filter 4, e.g., in the form of a corresponding catalytically-active coating.

According to this invention, the exhaust system 2 is also equipped with a recirculation device 8. The secondary fuel supply 6 is connected to the recirculation device 8, and the recirculation device 8 is connected to the exhaust line 3. In this way the secondary fuel is not sent directly from the secondary fuel supply 6 into the exhaust line 3 but instead is first sent into the recirculation device 8 and is thus sent indirectly to the exhaust line 3 via or through the recirculation device.

In the embodiment shown here, a secondary air feed which is optionally also provided allows the introduction of secondary air into the exhaust line 3. The secondary air feed 9 is also connected to the recirculation device 8 so that the introduction of secondary air into the exhaust line 3 does not take place directly but instead is accomplished indirectly via or through the recirculation device 8.

Figure 2:
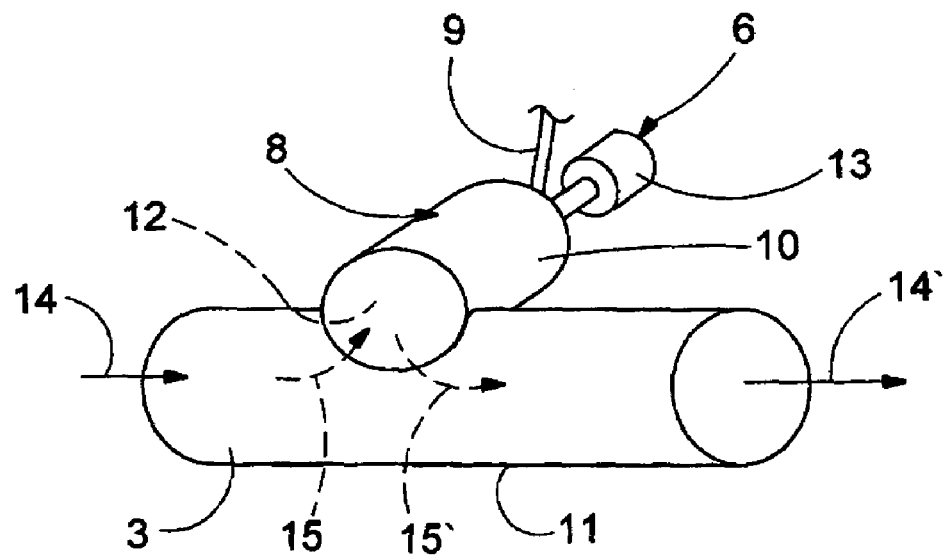
FIG. 2 shows an enlarged view of the exhaust system in a section equipped with a recirculation device.

According to FIG. 2, the recirculation device 8 may have a cylindrical housing 10 which is attached laterally to a longitudinal section 11 of the exhaust line 3. As an example here, the exhaust line 3 is also cylindrical in shape in the aforementioned longitudinal section 11. The recirculation device 8 contains in its interior a circulation space 12 into which the secondary fuel supply 6 introduces the secondary fuel, e.g., with the help of a fuel injector 13. An exhaust substream 15 is introduced into the circulation space 12 from a main exhaust stream 14 flowing in the exhaust line 3. Then in the circulation space 12 the secondary fuel is introduced into this exhaust substream 15. To this extent the exhaust substream 15 is modified to a certain extent. This modified exhaust substream 15' is then removed from the circulation space 12 and returned back to the exhaust line 3, i.e., the main exhaust stream 14. The main exhaust stream modified in this way, in particular enriched in this way, is labeled as 14' in FIG. 2. It is thus essential that the secondary fuel is not introduced directly into the main exhaust stream 14 but instead is introduced into an exhaust substream 15 which is separate from the main exhaust stream 14 and only the modified exhaust substream 15' is returned to the main exhaust stream 14.

Figure 3:
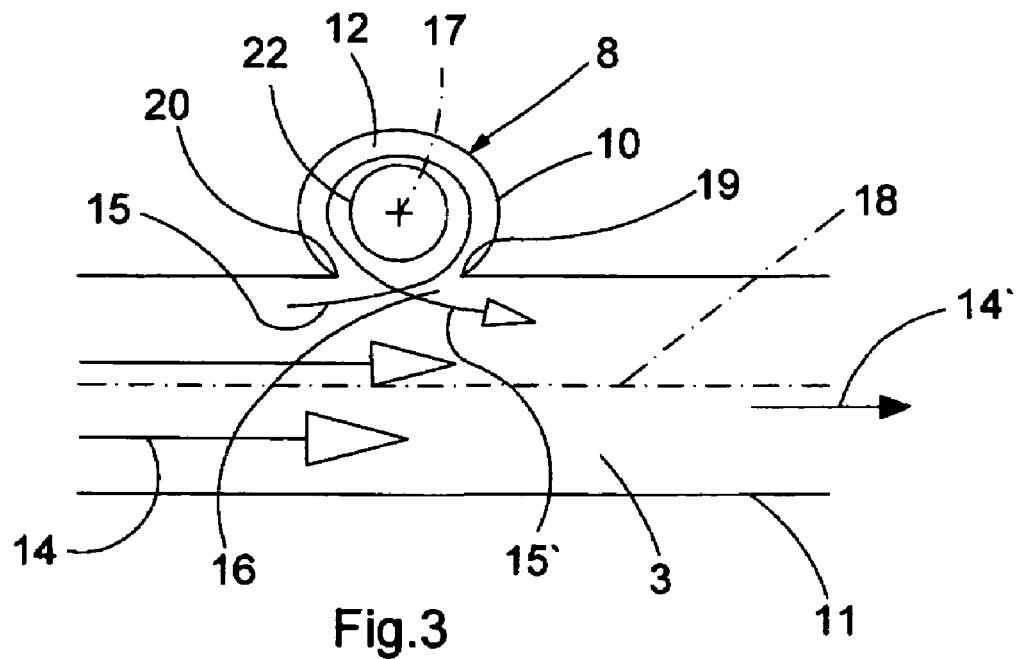
FIG. 3 shows a longitudinal section through the section from FIG. 2.

According to FIG. 3, the circulation space 12 is designed to be cylindrical and is arranged on the longitudinal section 11 of the exhaust line 3 in such a way that it intersects it, forming a connecting opening 16. A longitudinal direction 17 of the circulation space 12 here runs at an inclination to a longitudinal direction 18 of the longitudinal section 11 of the exhaust line 3. The longitudinal direction 17 of the circulation space 12 is preferably at a right angle to the longitudinal direction 18 of the longitudinal section 11, as is the case here.

The connecting opening 16 surrounds an oncoming flow edge 19 and an outgoing flow edge 20 which are situated upstream with respect to the oncoming flow edge 19. The exhaust substream 15 can penetrate out of the exhaust line 3 into the circulation space 12 via the oncoming flow edge 19. In contrast with that, the modified exhaust substream 15' can be returned out of the cylinder space 12 and into the exhaust line 3 via the outgoing flow edge 20.

As shown in FIG. 3, in the circulation space 12 this results in a type of cyclone flow for the exhaust substream 15 and/or 15', rotating essentially about the longitudinal direction 17 of the circulation space 12.

Figure 4:
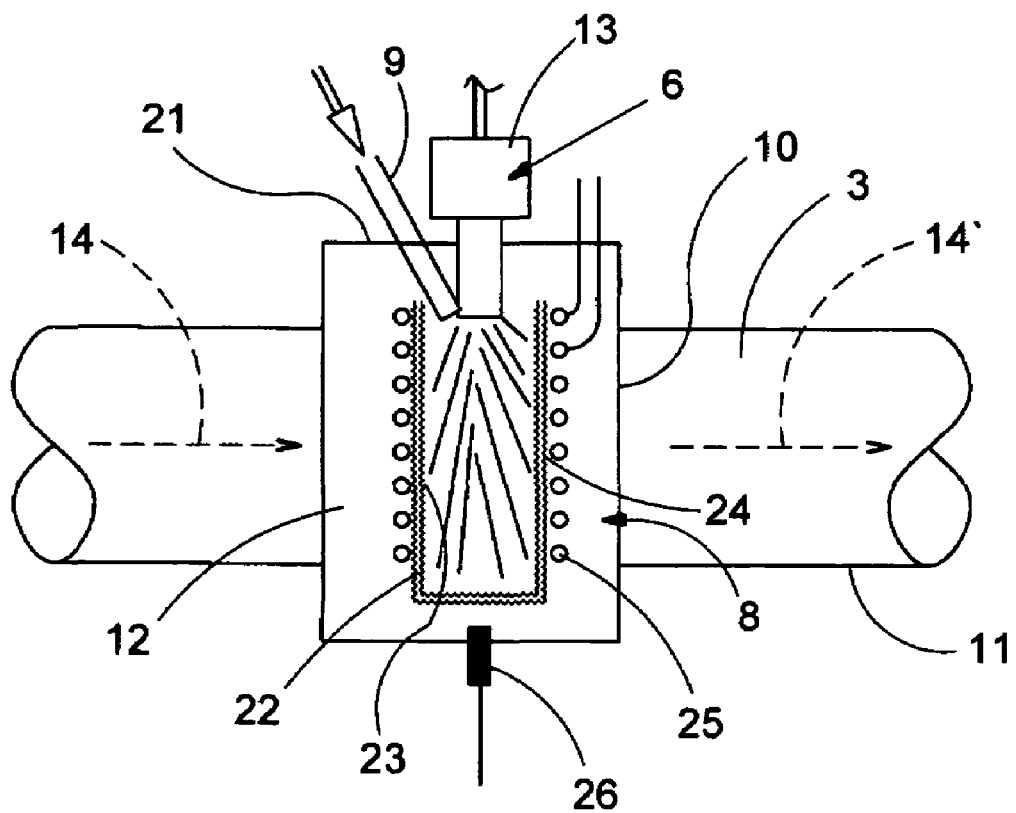
FIG. 4 shows a partially cut away top view of the section from FIG. 2.

The introduction of the secondary fuel is preferably performed at an axial end 21 of the cylinder space 12 (see FIG. 4 in particular). As mentioned previously, the secondary fuel supply 6 preferably has for this purpose a fuel injector 13 mounted on the axial end 21. The secondary fuel is introduced coaxially with the cylinder space 12, i.e., the secondary fuel is introduced, in particular injected, centrally in the axial direction from the end 21. Accordingly, the injector 13 injects the secondary fuel into the center of the cyclone flow of the exhaust substream 15, 15'.

The recirculation device 8 is preferably equipped with an evaporator body 22 which is arranged in the circulation space 12. The evaporator body 22 receives the secondary fuel supply 6, i.e., liquid secondary fuel through injector 13. The evaporator body 22 initially picks up the liquid secondary fuel and thereby permits evaporation of same and exposes the vaporous secondary fuel to the exhaust substream 15. For example, the evaporator body 22 is made of a porous material having an extremely large evaporator surface area on which the liquid secondary fuel is distributed. For example, the material of the evaporator body 22 may be a metallic or ceramic fiber nonwoven.

According to FIG. 4, the evaporator body 22 is preferably designed in the form of a sleeve and is arranged coaxially in the circulation space 12. The evaporator body 22 is open on the axial end facing the secondary fuel supply 6, so that liquid secondary fuel can be introduced into the interior of the evaporator body 22 through the injector 13. In contrast with that, the evaporator body 22 is closed at an axial end facing away from the secondary fuel supply 6. The secondary fuel supply 6 thus acts upon an inside 23 of the evaporator body 22 with liquid secondary nitrogen. The porous evaporator body 22 takes up the liquid secondary fuel and conveys it through its wall to the outside 24. The secondary fuel is vaporized at the latest on this outside 24, where the vaporized secondary fuel is exposed to the exhaust substream 15 which takes up the vaporous secondary fuel and conveys it through its wall to its outside 24. The evaporation of the secondary fuel then takes place at the latest on this outside 24 where the vaporized secondary fuel is exposed to the exhaust substream 15 which takes up the vaporous secondary fuel and conveys it away.

Figure 5:
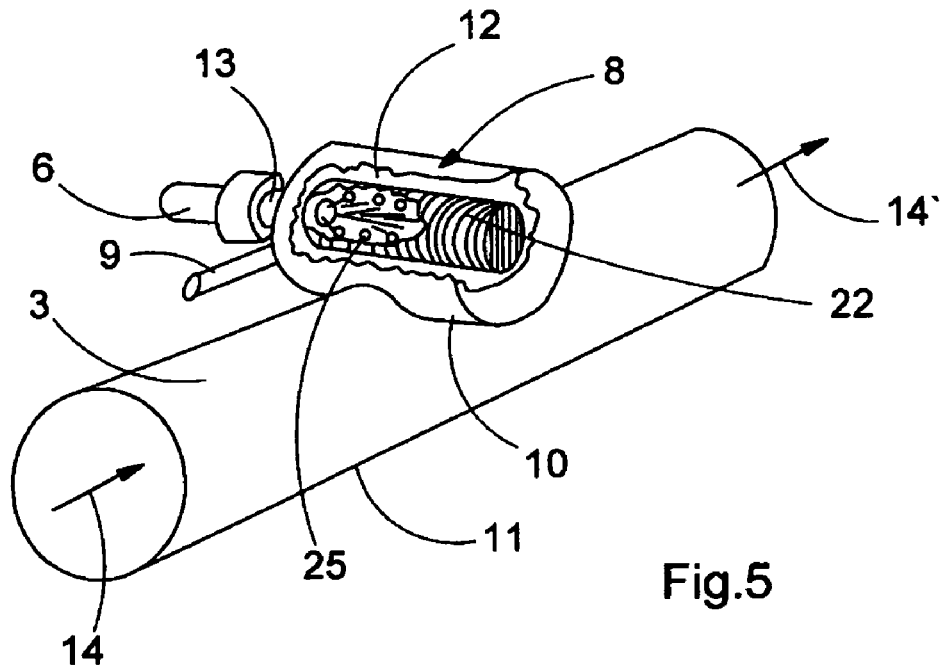
FIG. 5 shows a perspective view like that in FIG. 2 but partially cut away and from another direction of view.

To support the vaporization effect of the evaporator body 22, an electric heater 25 which is provided, as in the present case, may be connected to the evaporator body 22 in a heat-transmitting manner. For example, the heater 25 is implemented by a heating coil arranged on the outside 24 of the evaporator body 22. It is likewise possible to mount such a heater 25 on the inside 23 of the evaporator body 22. In addition, it is fundamentally also possible to integrate such a heater 25 into the evaporator body 22, in particular between the outside 24 and the inside 23. FIG. 5 shows an arrangement having an internal heater 25.

FIGS. 4 and 5 also show that the secondary air supply 9 is also expediently connected to the recirculation device 8 in such a way that the secondary air is introduced into the circulation space 12 and preferably into the interior of the hollow cylindrical evaporator body 22.

According to FIG. 4, the recirculation device 8 may also be equipped with an ignition unit 26, e.g., in the form of a sparkplug. It is possible in this way to ignite the fuel vapor-exhaust gas/air mixture formed in the circulation space 12 while it is still inside the recirculation device 8 to at least partially burn this mixture. At least a portion of the heat required to heat the particle filter 4 and/or the $NO_x$ storage catalyst 5 is generated in this process. If necessary, the oxidation catalyst 7 may also be heated in this way at low temperatures in the main exhaust stream 14. At the same time, the increase in temperature in the recirculation device 8 leads to an improved evaporation of the secondary fuel on the evaporator body 22. Furthermore, due to the control of the quantity of secondary air supplied, the amount of fuel reacted inside the recirculation device 8 can also be controlled.

In order for the introduction of secondary fuel to function properly, the amount of the exhaust substream 15, 15' which is branched off and returned, i.e., recirculated, is an important variable. The quantity of recirculated exhaust gas can be influenced through the geometric arrangement and the extent of the overlapping between the longitudinal section 11 of the exhaust line 3 and the housing 10 of the recirculation 8. A slight overlap results in a smaller quantity of recirculated exhaust gas, while a greater overlap then leads to a larger quantity of recirculated exhaust gas. In addition, there is automatically a dependence of the quantity of exhaust gas recirculated on the quantity of the main exhaust stream in the exhaust line 3. A larger exhaust gas mass flow in the exhaust line 3 leads to a greater mass flow in the recirculated exhaust gas and at the same leads to a higher rotational velocity for the exhaust substream 15 in the circulation space 12.

According to FIG. 3, the coaxial arrangement of the hollow cylindrical evaporator body 22 in the cylindrical circulation space 12 in the evaporator body leads to a flow path in the form of a ring segment. The exhaust substream 15, 15' is guided along this flow path from the oncoming flow edge 19 on the outside around the evaporator body 22 and to the outgoing flow edge 20.

In addition, the dependence of the recirculated exhaust gas quantity on the total quantity of the main exhaust stream can also be influenced through the geometric arrangement. In the case of a favorable design of the intersection, the mass flow dependence can be influenced in such a way that the recirculated exhaust gas quantity increases with the amount of exhaust gas in the main exhaust stream to the same extent as the required amount of fuel to be injected. The required amount of fuel to be injected is expediently calculated in turn from the data on the main exhaust stream.

Figure 6:
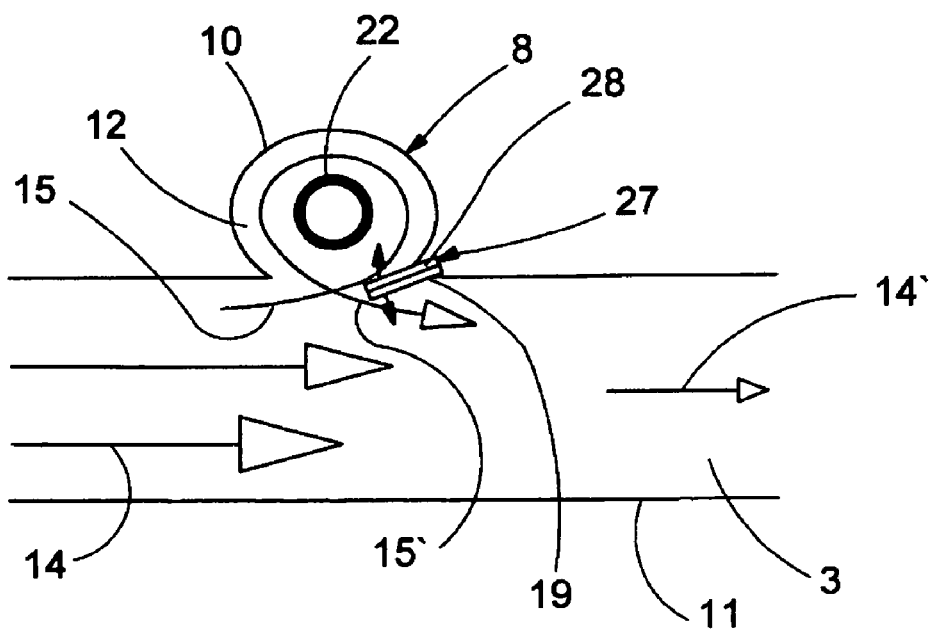
FIG. 6 shows a longitudinal section like that in FIG. 3 of another embodiment of the invention.

According to FIG. 6, a control unit 27 may be provided to influence the quantity of exhaust gas recirculated. The control unit 27 may expediently be designed so that it controls the amount of the exhaust substream 15 entering the circulation space 12 as a function of the exhaust gas temperature. For example, the control unit 27 includes an actuator element 28 which is arranged on the oncoming flow edge 19. In addition or as an alternative, the control unit 17 may also have an actuator element (not shown here) which is arranged on the outgoing flow edge 20. The actuating element 28 may then change its setting angle with respect to the main exhaust stream 14, in particular making the change automatically, as a function of the exhaust gas temperature. For example, the actuating element 28 may consist of one bimetal at least partially for this purpose. For example, with an increase in the exhaust gas temperature, the actuating element 28 reduces its setting angle with respect to the main exhaust stream 14, so that the mass flow of the exhaust substream 15 introduced into the circulation space 12 is reduced accordingly. At higher exhaust gas temperatures, even less secondary fuel must be supplied to be able to achieve the desired temperature increase for regeneration of the particle filter 4 and/or the $NO_x$ storage catalyst 5.

With the inventive recirculation device 8, the circulation space 12 is essentially independent of the exhaust main flow in exhaust line 3, so proper functioning of the supply of secondary fuel and its evaporation can be achieved in the recirculation device 8, namely independently of the current exhaust mass flow in the exhaust line 3.

With a traditional electric heating of an evaporator body 22 which is exposed directly to the exhaust stream in exhaust line 3, a considerable amount of the heat generated electrically is discharged with the exhaust gas, so a considerably larger amount of heat is available with the inventive recirculation device 8 for evaporating the secondary fuel because the evaporator body 22 receives only the comparatively small exhaust substream 15. The heat output from the recirculation device is comparatively low so the electric heating 25 of the evaporator body 22 can work with a comparatively low power.

It is also advantageous that, if necessary, an essentially constant and defined quantity of fuel can be supplied to the main exhaust stream 14 in the form of an exhaust gas/air-fuel vapor mixture with the help of the inventive recirculation device 8.

At especially low exhaust gas temperatures, the recirculation device 8 can also be operated with the help of the secondary air supply 9 and with the help of the ignition device 26 so that at least a portion of the secondary fuel is oxidized in the recirculation device 8.

The amount of secondary fuel to be evaporated is determined on the basis of the amount of secondary fuel injected. Expediently the injector 13 may therefore be designed as a pulse-controlled cycled injector 13. Such an injector 13 may be designed like an injector for an engine. In particular, the quantity of fuel metered may be adapted dynamically to the exhaust gas conditions such as the exhaust gas temperature and the exhaust gas mass flow, through the choice of the pulse frequency and pulse duration.

The axial length of the hollow cylindrical evaporator body 22 may depend, for example, on the injection angle which can be achieved with the injector 13.

At a sufficiently high exhaust gas temperature, the evaporator body 22 can be heated by the exhaust gas substream 15 rotating in the flow path around the evaporator body 22 to a temperature which is already high enough for vaporizing the secondary fuel. Subsequently, then an additional heating of the evaporator body 22 with the help of heater 25 is not necessary. In contrast with that, additional heating of the evaporator body 22 with the help of the heater 9 may be necessary at low exhaust temperatures.

With the arrangement of the electric heating unit 25 on the inside 23 of the evaporator body 22, it is advantageous that the heat released by the heater 9 to the exhaust gas rotating on the outside 24 of the evaporator body 22 is lower and therefore the resulting heat loss is lower.

For regeneration of the $NO_x$ storage catalyst 5, exhaust gas states may be generated on the engine end in which the exhaust gas is briefly operated up to a lambda value of approx. 1.05 to 1.1. Under some circumstances, even lower lambda values may occur. Essentially, corresponding values may also occur at a full load of the internal combustion engine 1.

In such operating states, it may be desirable to oxidize the mixture of secondary fuel and exhaust gas substream 15 in the recirculation device 8 with additional oxygen. The ignitable mixture is formed here already at the surface of the evaporator body 22. To improve the formation of the mixture here and/or to improve the injection of secondary air, measures that influence the flow may be taken. For example, the secondary air may be introduced into the evaporator body with an additional twist.

The invention claimed is:

1. An exhaust system for an internal combustion engine, said system comprising:
    an exhaust line for discharging exhaust gas from the internal combustion engine;
    a secondary fuel supply for introducing secondary fuel into the exhaust gas of the internal combustion engine;
    a recirculation device connected to said exhaust line and to said secondary fuel supply so that the secondary fuel is introduced into the exhaust gas via or through said recirculation device;
    wherein said recirculation device defines a circulation space; which receives an exhaust gas substream from said exhaust line, in which the secondary fuel is introduced into said exhaust gas substream and from which the modified exhaust gas substream is returned back to said exhaust line,
    wherein said circulation space is cylindrical and intersects a longitudinal section of said exhaust line, thereby forming a connecting opening; a longitudinal axis of said circulation space runs at an inclination with respect to a longitudinal axis of said longitudinal section; and said connecting opening has an oncoming flow edge over which the exhaust gas substream from said exhaust line enters said circulation space; and
    wherein said connecting opening has an outgoing flow edge situated in said exhaust line upstream from the oncoming flow edge and via which said modified exhaust substream is recycled from said circulation space into said exhaust line.

2. The exhaust system according to claim 1, wherein said longitudinal axis of said circulation space is aligned across said longitudinal direction of said longitudinal section.

3. The exhaust system according to claim 1, wherein the secondary fuel is introduced at an axial end of said circulation space in coaxial relation therewith.

4. The exhaust system according to claim 1, further comprising an evaporator body in the circulation space which receives the secondary fuel supply of liquid secondary fuel, the secondary fuel evaporating on the evaporator body and being entrained by the exhaust gas substream.

5. The exhaust system according to claim 4, wherein
    the evaporator body is in the form of a sleeve and is arranged coaxially in the circulation space,
    the secondary fuel supply supplies secondary fuel to the inside of the evaporator body, and
    the evaporator body exposes the vaporized secondary fuel to the exhaust gas substream on the outside.

6. The exhaust system according to claim 5, wherein a flow path in the form of a ring segment is created in the circulation space, carrying the exhaust gas substream from the oncoming flow edge outward around the evaporator body to the outgoing flow edge.

7. The exhaust system according to claim 4, wherein the evaporator body is connected to an electric heater in a heat-transmitting connection.

8. The exhaust system according to claim 1, further comprising a secondary air feed connected to the recirculation device, said secondary air feed introducing the secondary air into the circulation space.

9. The exhaust system according to claim 8, further comprising an evaporator body in the circulation space which receives the secondary fuel supply of liquid secondary fuel, the secondary fuel evaporating on the evaporator body and being entrained by the exhaust gas substream, wherein the secondary air feed supplies the secondary air to the evaporator body on its outside.

10. The exhaust system according to claim 1, further comprising a control unit, said control unit controlling the amount of the exhaust substream entering the circulation space as a function of the exhaust gas temperature.

11. The exhaust system according to claim 1, further comprising a control unit, said control unit controlling the amount of the exhaust substream entering the circulation space as a function of the exhaust gas temperature; said control unit comprising an actuator element arranged on at least one of the oncoming flow edge and the outgoing flow edge, said actuator element having a setting angle defined with respect to the main exhaust stream flow, said actuator element changing said setting angle as a function of the exhaust gas temperature.

12. The exhaust system according to claim 11, wherein said actuator element comprises a bimetal.

* * * * *